United States Patent
Biswas et al.

(10) Patent No.: US 8,019,889 B1
(45) Date of Patent: Sep. 13, 2011

(54) METHOD AND APPARATUS FOR MAKING END-HOST NETWORK ADDRESS TRANSLATION (NAT) GLOBAL ADDRESS AND PORT RANGES AWARE

(75) Inventors: Kaushik P. Biswas, San Jose, CA (US); Siva S. Jayasenan, Cupertino, CA (US); Michael L. Sullenberger, San Jose, CA (US); Mark A. Denny, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2118 days.

(21) Appl. No.: 10/160,321

(22) Filed: May 31, 2002

(51) Int. Cl.
*G06F 15/16* (2006.01)
(52) U.S. Cl. ........... 709/245; 709/229; 370/392
(58) Field of Classification Search .......... 709/245, 709/229; 370/392
See application file for complete search history.

(56) References Cited

U.S. PATENT DOCUMENTS 6,128,664 A * 10/2000 Yanagidate et al. ......... 709/228
6,651,092 B1 * 11/2003 Muraoka ..................... 709/220
6,748,439 B1 * 6/2004 Monachello et al. ........ 709/229
6,772,347 B1 * 8/2004 Xie et al. .................... 726/11
6,870,845 B1 * 3/2005 Bellovin et al. ............. 370/392

OTHER PUBLICATIONS

P. Srisuresh, M. Holdrege, "IP Network Address Translator (NAT) Terminology an Considerations", Lucent Technologies, Aug. 1999, RFC 2663.
H. Levkowetz, "DHCP Option for Mobile IP Foreign Agents", Internet Society, Feb. 22, 2002.

* cited by examiner

*Primary Examiner* — Kyung-Hye Shin
(74) *Attorney, Agent, or Firm* — Weaver Austin Villeneuve & Sampson LLP

(57) ABSTRACT

Disclosed are methods and apparatus for handling data having an embedded address (and port). In general terms, a host of a private network is operable to obtain from its corresponding edge router a global address (GA) and optionally an additional global port range (GPR). When the host then wishes to transmit data out of the private network, the obtained GA (and GPR) may then be used for an embedded address (and port) within data sent by the host to a public network. The obtained GA (and GPR) may also be used by the host to translate its own source address and port in its IP and/or TCP/UDP header if needed.

50 Claims, 12 Drawing Sheets

METHOD AND APPARATUS FOR MAKING END-HOST NETWORK ADDRESS TRANSLATION (NAT) GLOBAL ADDRESS AND PORT RANGES AWARE

BACKGROUND OF THE INVENTION

The present invention relates to methods and apparatus for processing data within a computer network. More specifically, it relates to mechanisms for performing network address translation on data transmitted within such computer network.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP address is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may be a duplicate of an IP address that is used within another local network. When a local computer attempts to communicate with a computer outside the local network, the intermediary device maps the local computer's IP address to one of the intermediary device's assigned globally unique IP addresses. The intermediary device than replaces the local computer's address with this globally unique IP address enabling the local computer to communicate with the outside computer. If the intermediary device is assigned only one globally unique IP address, then it needs to share this globally unique IP address amongst all the local computers for which it is acting as an agent. Thus the intermediary device would need to modify the TCP/UDP ports for the traffic from the local computers such that it can uniquely map the tuple (local address, local TCP/UDP port number) to the globally unique IP address and assigned TCP/UDP port number. This is called network address port translation (NAPT). The term NAT is used in a generalized form to mean network address translation (NAT) and network address port translation (NAPT). In short, NAT techniques allow IP address to be duplicated across local networks.

In addition, a packet may also contain local IP address(es) and/or TCP/UDP ports embedded in the payload that require translation. Particular applications may embed IP address(es) and/or TCP/UDP ports in the payload for various application specific purposes. The current approach for supporting applications which embed IP addresses and/or TCP/UDP ports in the payload (e.g., DNS (domain name server), FTP (file transfer protocol), H.225/H.245) in a NAT environment is to add application-specific knowledge within the NAT device itself. This approach is described in detail in the Internet Engineering Task Force's Request for Comments document RFC 2663, entitled IP "Network Address Translator (NAT) Terminology and Considerations" by P. Srisuresh and M. Holdrege of Lucent Technologies (August 1999), which document is incorporated herein by reference in its entirety.

Unfortunately, this approach has several associated disadvantages. For example, this approach requires that the NAT device be reprogrammed for each new application or change in an existing application. This reconfiguration process is typically time consuming and complex. Additionally, since NAT devices are typically deployed at the edge of each local network and the number of local networks is rapidly increasing, the number of NAT devices that need to be reconfigured for a new or modified application may quickly become prohibitively large. Also if the payload is encrypted, then the NAT device cannot modify the embedded local IP address(es) and/or TCP/UDP ports to the globally unique IP address(es) and/or TCP/UDP ports.

Accordingly, there is a need for improved network address translation mechanisms that do not require reconfiguration for each new or modified application, as well as mechanisms for handling embedded addresses.

SUMMARY OF THE INVENTION

Accordingly, the present invention provides methods and apparatus for handling data having an embedded address (and port). In general terms, a host of a private network is operable to obtain from its corresponding edge router a global address (GA) and optionally a global port range (GPR). When the host then wishes to transmit data out of the private network, the obtained GA (and GPR) may then be used for an embedded address (and port) within data sent by the host to a public network. The obtained GA (and GPR) may also be used by the host to translate its own source address and port in its IP and/or TCP/UDP header if needed.

In one embodiment, method for sending data from a first host of a private network is disclosed. A local address for the first host is obtained prior to sending data from the first host. A global address for the first host is obtained prior to sending data from the first host. When data is being sent from the first host of the private network to a second host of a public network and when the data is to include an embedded address, the obtained global address is used as the embedded address. When data is being sent from the first host of the private network to a second host of the private network and when the data is to include an embedded address, the obtained local address is used as the embedded address. The data is sent towards its destination (e.g., through the edge router).

In another aspect, a global port range for the first host is also obtained. When data is being sent from the first host of the private network to a second host of a public network and when the data is to include an embedded port, a global port selected from the obtained global port range is used as the embedded port. The global address, the global port range, and the local address are obtained by sending a request for a local address to an edge router associated with the first host and receiving a reply having the local address, the global address, and the global port range. The request for local address is in the form of a DHCP request for a local address, and the reply is a DHCP reply which includes the global address and global port range. In one aspect, the local address is obtained by sending a request for a local address to an edge router associated with the first host and receiving a reply having the local address, and the global address and global port range are obtained by sending a separate request for a global address to the edge router and receiving a reply having the global address and the global port range.

In a further aspect, the request for a local address is a DHCP request for a local address, the reply having the local address is a DHCP reply having the local address, the request for a global address is a DHCP request with a DHCP option indicating that it is a DHCP request for a global address, and the reply having the global address and the global port range is a DHCP reply having the global address and the global port range. In another implementation, a second global port range that differs from the first obtained global port range for the first host is obtained when all of the global ports within the first obtained global port range are being used by the first host. The global address, the first global port range, and the local address are obtained by sending a request for a local address to an edge router associated with the first host and receiving a reply having the local address, the global address, and the first global port range. The reply further includes an address for a global address provider (GAP) device, and wherein the second global port range is obtained by sending a request for a second global port range to the global address provider (GAP) device based on the address of the global address provider device (GAP) and receiving a reply having the second global port range.

In another implementation, when data is being sent from the first host of the private network to the second host of the public network, the obtained global address is used as a source address within the data. When data is being sent from the first host of the private network to the second host of the private network, the obtained local address is used as a source address within the data.

In a further aspect, the global address and the local address are obtained by sending a request for a local address to an edge router associated with the first host and receiving a reply having the local address and the global address. In one implementation, the request is sent to an authorization, authentication, and accounting (AAA) device so the AAA device may determine whether the first host is authorized prior to obtaining the global address, wherein the global address is not obtained when the first host is not authorized.

In another aspect, the local address is obtained by sending a request for a local address to an edge router associated with the first host and receiving a reply having the local address, and wherein the global address is obtained by sending a request for a global address to the edge router and receiving a reply having the global address. In a further implementation, the reply having the local address also includes an address for a global address provider (GAP) device and wherein the request for the global address is sent to the global address provider (GAP) device using the address for the global address provider (GAP). In one aspect, the request for a global address is sent to an authorization, authentication, and accounting (AAA) device so the AAA device may determine whether the first host is authorized prior to obtaining the global address, wherein the global address is not obtained when the first host is not authorized. In another embodiment, the request for a local address is a DHCP request for a local address, the reply having the local address is a DHCP reply having the local address, the request for a global address is a DHCP request with DHCP option indicating request for a global address, and the reply having the global address is a DHCP reply having the global address.

In another embodiment, the invention pertains to a computer system operable to send data from a first host of a private network. The computer system includes one or more processors and one or more memory. At least one of the memory and processors are adapted to provide at least some of the above described method operations. In yet a further embodiment, the invention pertains to a computer program product for sending data from a first host of a private network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
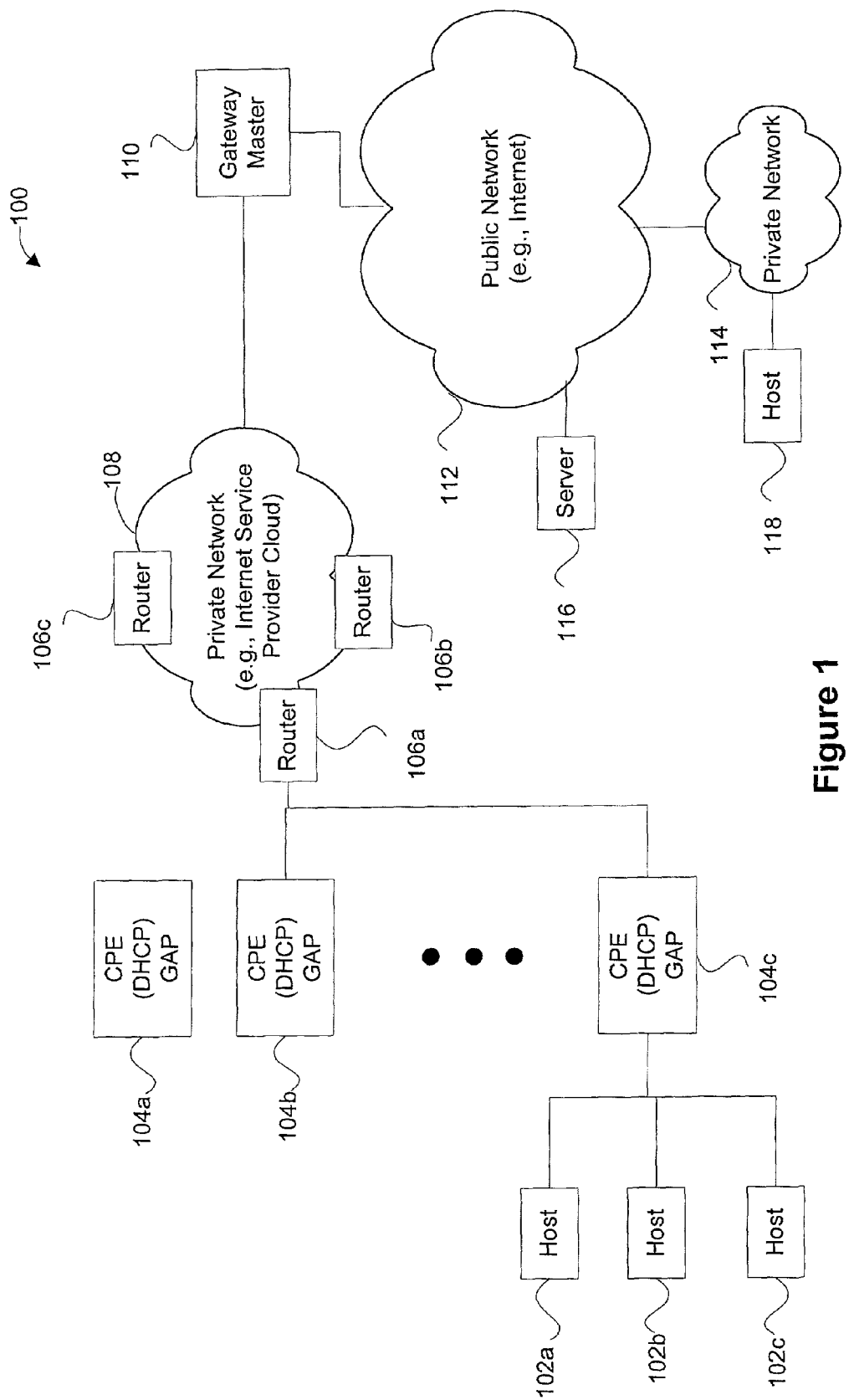
FIG. 1 is a diagrammatic representation of computer network in which the present invention may be implemented in accordance with one embodiment of the present invention.

FIG. 1 is a diagrammatic representation of a network in which the present invention may be implemented in accordance with one embodiment of the present invention. As shown, the network 100 includes a private network 108, such as an Internet Service Provider (ISP) cloud coupled with a Gateway Master 110 and a plurality of edge routers 104. The private network 108 also includes a plurality of intermediary routers 106. Each edge router 104 may be coupled to one or more hosts 102.

The Gateway Master 110 is coupled with a public network 112, which is coupled with private network 116. Each of the networks 108, 112, and 116 may be coupled with one or more devices. The gateway master 110 is operable to handle communication between the ISP network 108 and public network 112. The gateway master 110 may also be referred to as a network address translation (NAT) device. Network addresses (e.g., IP addresses) used by devices of the public network 112 are referred to as "outside" addresses with respect to gateway master 110. Outside addresses may include addresses associated with devices coupled to the public network 112. Outside addresses may also include an address of data that is transmitted through public network 112 from another network, such as private network 114. An address from host 102a of private network 108, for example, is translated to be compatible with public network 112 as the data travels through network 112. Network addresses associated with devices of the private network 108 are referred to as "inside" addresses with respect to Gateway Master 110.

Although each set of addresses are unique within their respective networks, the inside address realm or local networks 108 and 114 and public network 112 may include one or more addresses that overlap with each other. To avoid duplication of network addresses by two communicating endpoints, the Gateway Master 110 generally translates between addresses used within the private network 108 and addresses used within the public network 112).

In the illustrated embodiment, Gateway Master 110 translates local addresses of data received from a private network 108 into global addresses of data being output from the Gateway Master 110 to public network 112, and vice versa. The Gateway Master 110 also translates global addresses of data received from public network 112 into local addresses of data being output from the Gateway Master 110 to private network 108, and vice versa. The Gateway Master 110 may also (or alternatively) translate ports, such as TCP (transmission control protocol) or UDP (User Datagram Protocol) ports, between the two realms. The Gateway Master 110 also maintains state information regarding each network address translation.

Several typical operations that may be performed during a traditional NAT are omitted so as to not obscure the invention with unnecessary details which are well known to those skilled in the art. For instance, the present invention may include mechanisms for logging an error if a private address has no defined binding or rule set and there are no more available public addresses in the NAT device's pool for translation. Several typical procedures that may be performed on data along with translating the data and/or sending it to its destination are described further in U.S. Pat. No. 5,793,763 by Mayes et al., issued Aug. 11, 1998, which patent is incorporated herein by reference in its entirety.

The edge routers 104 may be provisioned such that each edge router in the private network 108 has a unique and non-overlapping global address (GA) and global port range (GPR).

In the present invention, a host of a private network, such as each host 102 of network 108, is operable to obtain from its corresponding edge router a global address (GA) and optionally an additional global port range (GPR) to thereafter be embedded within data sent by the host to a public network. In the illustrated embodiment, each host 102 of private network 108 is operable to obtain from its corresponding edge router 104 either (1) a global address for itself or (2) a GA and GPR for itself.

Each host may be operable to use any suitable mechanism for obtaining a (1) GA or (2) GA and GPR from its edge router. By way of examples, each host may send a proprietary request for a global address or a DHCP (Dynamic Host Configuration Protocol) request for a GA to its corresponding edge router. The edge router responds with either (1) the GA or (2) GA and GPR for such querying host. In an alternative embodiment, each host may simply sends a DHCP request for a local address to its corresponding edge router 104, which responds with a DHCP reply having the local address as well as the GA (and GPR) for the querying host.

In one embodiment, each one or more of the edge routers 104 has a GA and GPR that may be apportioned among its corresponding hosts. For example, edge router 104c may have GA 172.1.1.1 and GPR 10000 through 15000. When host 102a makes a request for a GA and GPR, edge router 104c may then assign the GA 172.1.1.1 and a portion of its available GPR to host 102a. For instance, GPR 10000 through 10100 is assigned to host 102a. Each edge router 104 preferably tracks its GPR assignments so that data that is destined for any of its hosts may be sent to the correct host. That is, data having a global destination port of 10001 will be sent to host 102a since this global port value is within the GPR 10000 through 10100 previously assigned to host 102a. One or more of the edge routers may also have only a pool of GA's to be assigned to requesting hosts.

Each edge router 104 may be in the form of a customer premises equipment (CPE), such as a cable modem. Each edge router 104 may also include DHCP capabilities and/or GAP (Global Address Provider) capabilities. DHCP capabilities generally include responding to DHCP requests for a local address or a global address. GAP capabilities generally include responding to a request for a global address with a reply having either (1) the GA or (2) GA and GPR for the querying host.

In a first embodiment, each edge router may include all three CPE, DHCP, and GAP capabilities, or these capabilities may be configured in two or more individual devices including the edge router. The DHCP capabilities are optional and may not be present when a proprietary request and reply is used to obtain a GA (and GPR) for a host. FIGS. 2A through 2D are diagrammatic representations of several different configurations of devices which may each be operable to provide a GA (and GPR) to a corresponding host.

Figure 2A:
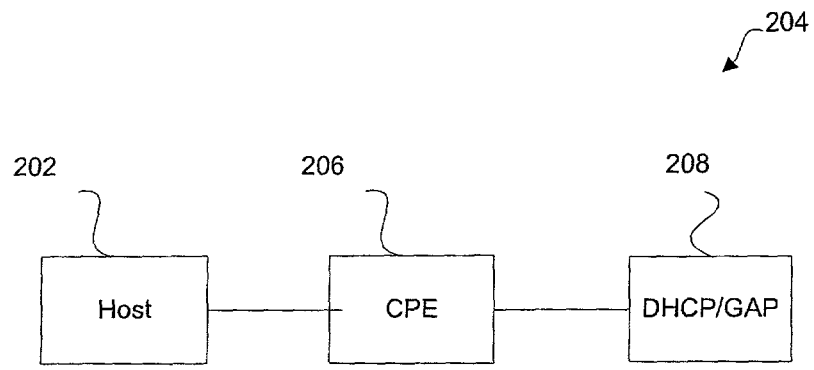
FIG. 2A shows a plurality of Customer Premise Equipment, Dynamic Host Configuration Protocol, and Global Address Provider (CPE/DHCP/GAP) devices for providing either (1) a global address (GA) or (2) a GA and global port range (GPR) to a corresponding host in accordance with a second embodiment of the present invention.
Figure 2B:
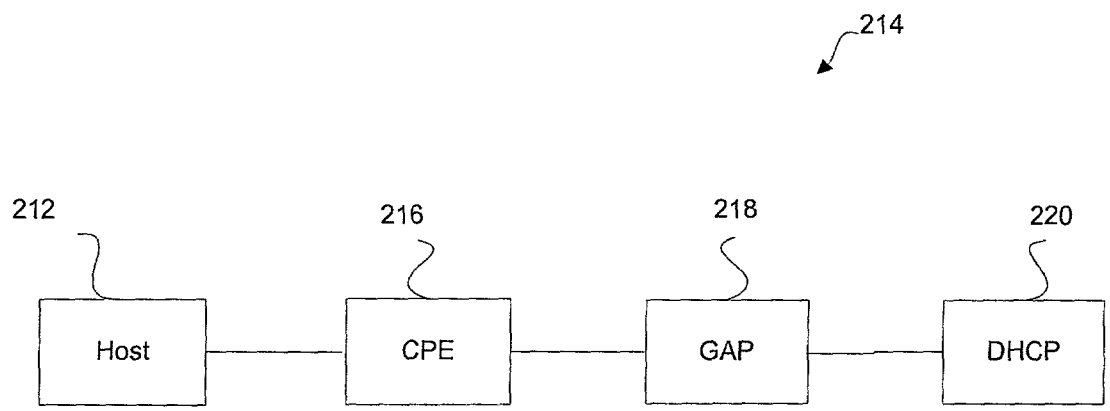
FIG. 2B is a diagrammatic representation of a plurality of CPE/DHCP/GAP devices for providing either (1) a GA or (2) GA and GPR to a host in accordance with third NSF embodiment of the present invention.
Figure 2C:
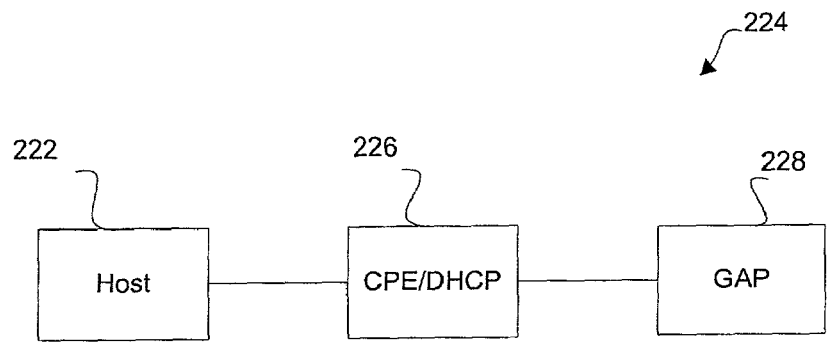
FIG. 2C is a diagrammatic illustration of a plurality of CPE/DHCP/GAP devices for providing either (1) a GA or (2) GA and GPR to a host in accordance with fourth embodiment of the present invention.
Figure 2D:
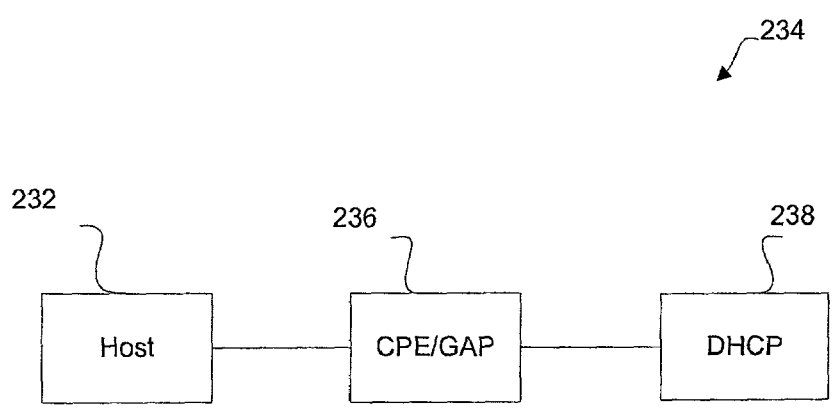
FIG. 2D is a diagrammatic representation of a plurality of CPE/DHCP/GAP devices for providing either (1) a GA or (2) GA and GPR to a host in accordance with fifth embodiment of the present invention.

FIG. 2A shows a plurality of CPE/DHCP/GAP devices 204 for providing either (1) a GA or (2) GA and GPR to a corresponding host in accordance with a second embodiment of the present invention. As shown, a host 202 is coupled to a CPE 206, which is coupled to a device 208 that includes DHCP and GAP capabilities. FIG. 2B is a diagrammatic representation of a plurality of CPE/DHCP/GAP devices 214 for providing either (1) a GA or (2) GA and GPR to a host 212 in accordance with third embodiment of the present invention. As shown, the host 216 is coupled to a CPE 216, which is coupled to a GAP 218, which is coupled to a DHCP 220. FIG. 2C is a diagrammatic illustration of a plurality of CPE/DHCP/GAP devices for providing either (1) a GA or (2) GA and GPR to a host 222 in accordance with fourth embodiment of the present invention. As shown, the host 222 is coupled to a combination CPE and DHCP device 226, which is coupled to a GAP device 228. FIG. 2D is a diagrammatic representation of a plurality of CPE/DHCP/GAP devices for providing either (1) a GA or (2) GA and GPR to a host 232 in accordance with fifth embodiment of the present invention. As shown, host 232 is coupled to a combination CPE and GAP device 236, which is coupled to a DHCP device 238.

FIGS. 3A through 3E are communication diagrams which each illustrate a procedure for obtaining a global address for the above described five embodiments of the CPE/DHCP/GAP devices. In each of these embodiments, the host 102a initially sends a DHCP request for a local address for itself to its corresponding edge router, e.g., CPE. In response, the host 102a receives a local address and either (1) a GA or (2) a GA and GPR for itself. Alternatively, the DHCP request and reply for the local address may occur separately from a DHCP request and reply for the GA. In another embodiment, the host 102a may send a proprietary request for a GA after obtaining its local address. The host 102a may also be pre-configured with a local address and not have to obtain a local address.

Figure 3A:
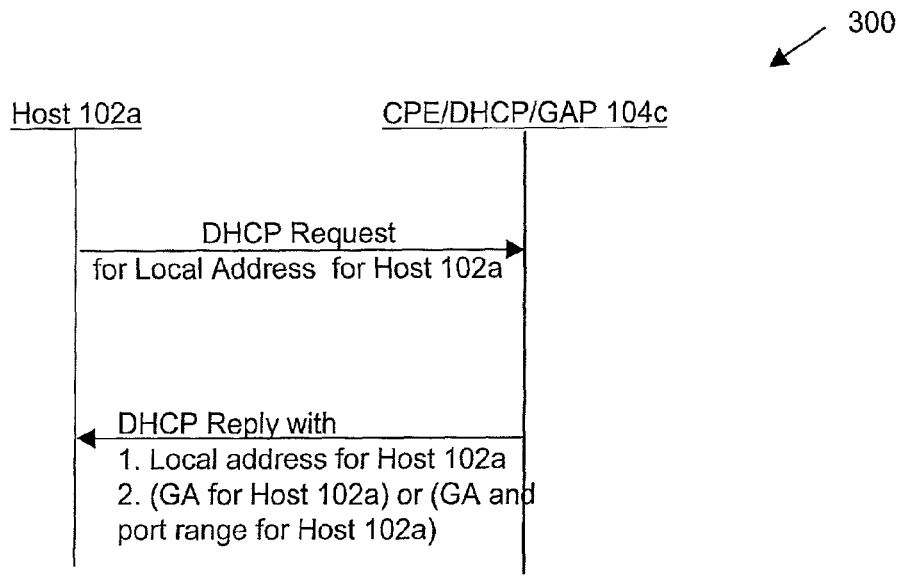
FIG. 3A is a communication diagram illustrating a procedure for a host obtaining either (1) a GA or (2) GA and GPR from a device having CPE, DHCP, and GAP capabilities in accordance with a first embodiment of the present invention.
Figure 5:
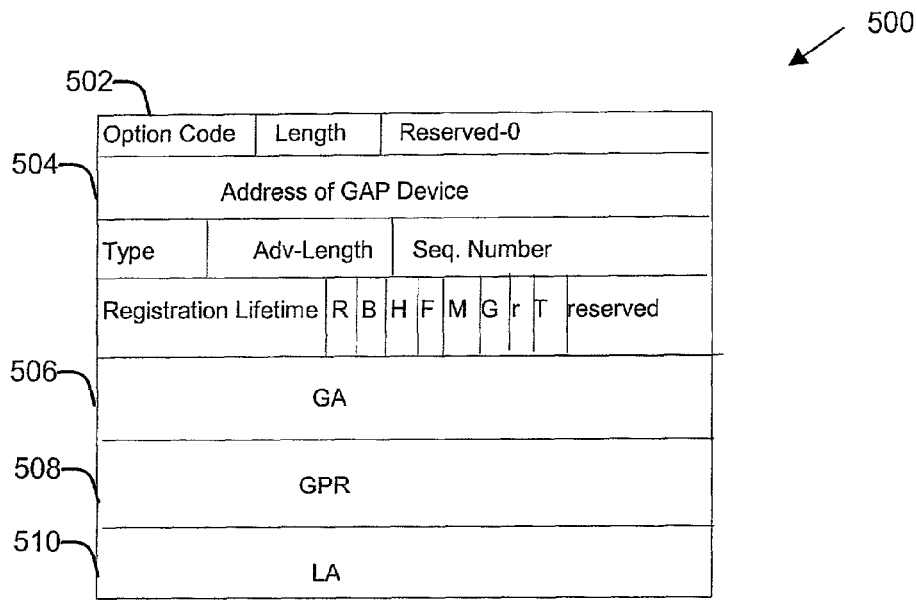
FIG. 5 is a diagrammatic representation of a DHCP option having a local address and either (1) a GA or (2) GA and GPR for the requesting host in accordance with one embodiment of the present invention.

FIG. 3A is a communication diagram illustrating a procedure 300 for a host 102a obtaining a global address from a device 104c having CPE, DHCP, and GAP capabilities in accordance with a first embodiment of the present invention. As shown, host 102a sends a DHCP request for a local address for host 102a to CPE/DHCP/GAP device 104c. The CPE/DHCP/GAP device 104c then sends a DHCP reply with DHCP option having a local address for 102a and either (1) a GA for host 102a or (2) a GA and GPR for host 102a. A possible format of the DHCP option in the DHCP reply is shown in FIG. 5. Alternatively, CPE/DHCP/GAP device 104c may respond with the local address for host 102a only. The host 102a then sends a DHCP or a proprietary request for a GA to CPE/DHCP/GAP device 104c. The CPE/DHCP/GAP device 104c then sends a DHCP or proprietary reply having only the (1) GA or (2) GA and GPR for host 102a. Possible formats for the DHCP option in request for a GA and reply are described further below with reference to FIG. 5. Likewise, example embodiments of a proprietary request and reply for a GA are described further below with reference to FIGS. 6A and 6B.

Figure 3B:
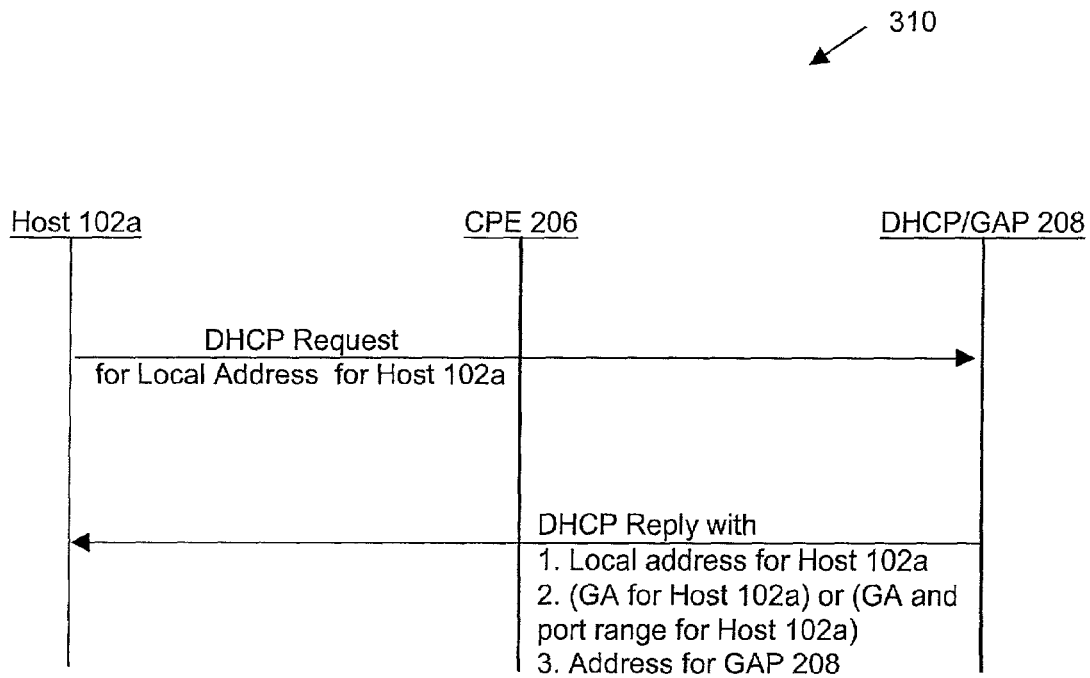
FIG. 3B is a communication diagram illustrating a procedure for a host to obtain either (1) a GA or (2) GA and GPR through a CPE device which is physically separate from a corresponding DHCP/GAP device in accordance with a second embodiment of the present invention.

FIG. 3B is a communication diagram illustrating a procedure 310 for a host 102a to obtain a global address through a CPE device 206 which is physically separate from a corresponding DHCP/GAP device 208 in accordance with a second embodiment of the present invention. Initially, host 102a sends a DHCP request for a local address for host 102a to CPE 206. The CPE 206 is operable as a DHCP relay and thereby forwards the DHCP request to DHCP/GAP device 208. The DHCP/GAP device 208 then returns a DHCP reply having a local address for host 102a, either (1) a GA for host 102a or (2) a GA and GPR for host 102a, and an address for GAP device 208.

In the illustrated embodiments in which the GAP device is physically separate from the CPE device (e.g., FIGS. 3B through 3D), the reply is shown to include the GAP device's address. The host 102a may then subsequently use the address for the GAP device to obtain an additional GPR (e.g., if the host 102a eventually uses all of its ports within its obtained GPR) from the GAP device. Possible formats for the DHCP request/reply for an additional GPR may be similar to the DHCP request/reply for GA and are described further below with reference to FIG. 5. Likewise, example embodiments of a proprietary request and reply for an additional GPR may be similar to the one for GA, and are described further below with reference to FIGS. 6A and 6B. Alternatively, the DHCP reply may only include the address for the GAP device 208 and so that the host 102a may thereafter send a request for its GA (and GPR) to the GAP device in a communication that is separate from the DHCP request for the local address.

Figure 3C:
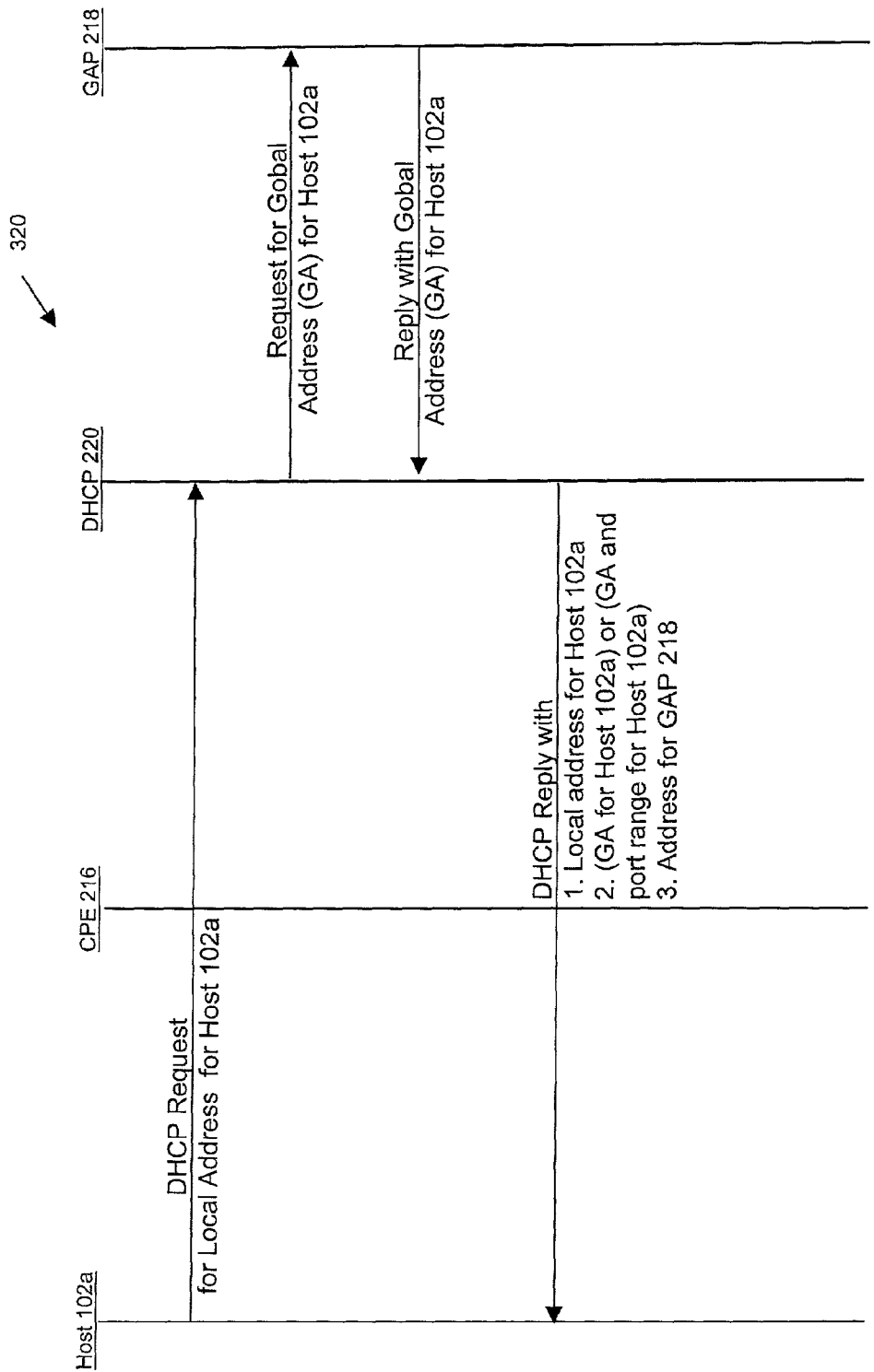
FIG. 3C is a communication diagram illustrating a procedure for a host to obtain either (1) a GA or (2) GA and GPR through a CPE device which is physically separate from a corresponding DHCP device and a GAP device in accordance with a third embodiment of the present invention.

FIG. 3C is a communication diagram illustrating a procedure 320 for a host 102a to obtain a global address through a CPE device 216 which is physically separate from a corresponding DHCP device 220 and a GAP device 218 in accordance with a third embodiment of the present invention. Initially, the host 102a sends a DHCP request for a local address for host 102a to CPE 216. The CPE 216 forwards the request to DHCP device 220. The DHCP device 220 is operable to send a request for the global address for host 102a to GAP device 218. The GAP 218 then replies with the global address for host 102a to DHCP 220. The DHCP 220 may then send a DHCP reply having a local address for host 102a, either (1) a GA for host 102a or (2) a GA and GPR for host 102a, and an address for GAP device 218 to host 102a.

Figure 3D:
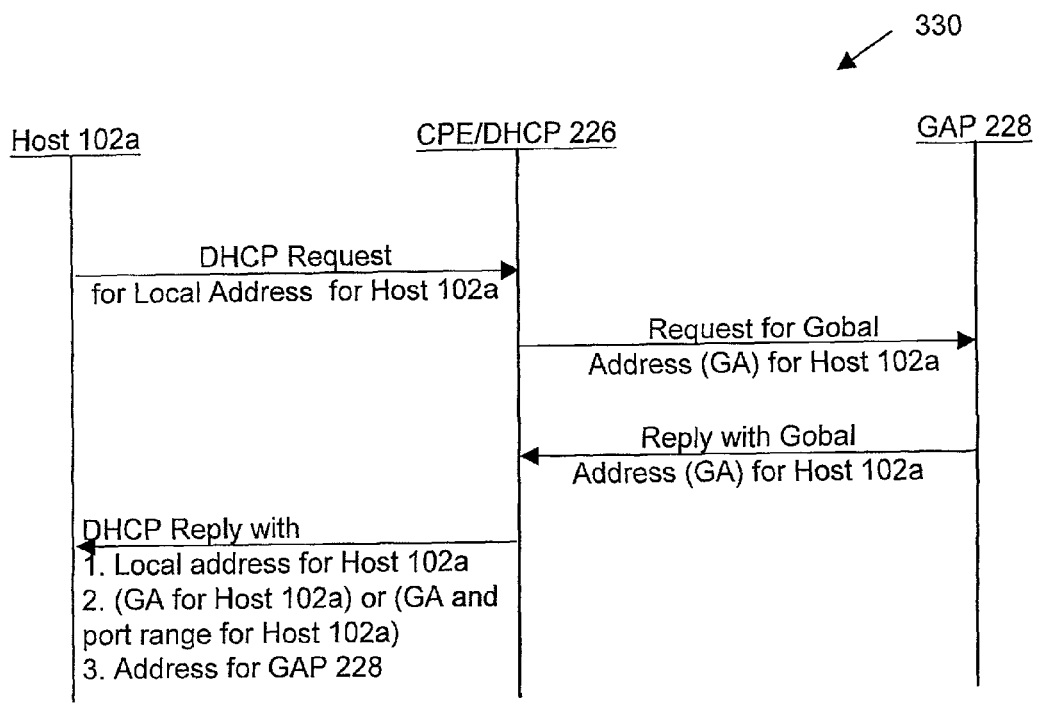
FIG. 3D is a communication diagram illustrating a procedure for a host to obtain either (1) a GA or (2) GA and GPR through a CPE/DHCP device which is physically separate from a GAP device in accordance with a fourth embodiment of the present invention.

FIG. 3D is a communication diagram illustrating a procedure 330 for a host 102a to obtain a global address through a CPE/DHCP device 226 which is physically separate from a GAP device 228 in accordance with a fourth embodiment of the present invention. Initially, the host 102a sends a DHCP request for a local address for host 102a to CPE/DHCP device 226. The CPE/DHCP device 226 then sends a request for the global address for host 102a to GAP device 228. The GAP device 228 then sends a reply with the global address for host 102a and GPR (if any) to CPE/DHCP device 226. The CPE/DHCP device 226 then sends a DHCP reply having the local address for host 102a, either (1) a GA for host 102a or (2) a GA and GPR for host 102a, and the address for a GAP device 228.

Figure 3E:
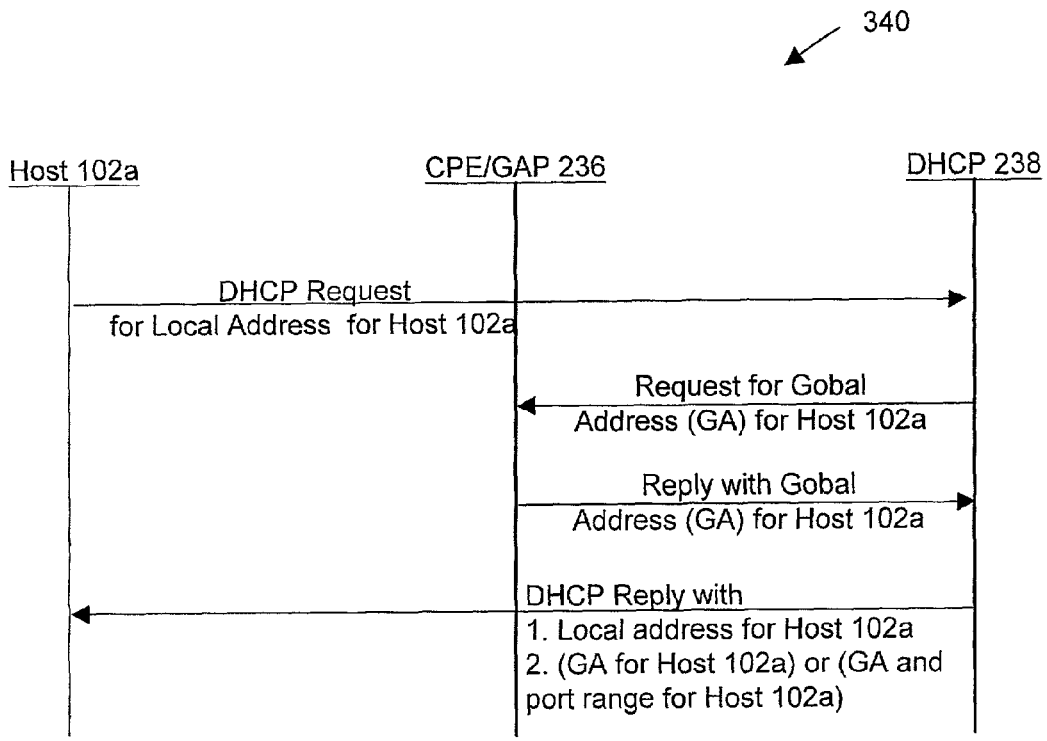
FIG. 3E is a communication diagram of a procedure for a host to obtain either (1) a GA or (2) GA and GPR through a CPE/GAP device which is physically separate from a DHCP device in accordance with a fifth embodiment of the present invention.

FIG. 3E is a communication diagram of a procedure 340 for a host 102a to obtain a global address through a CPE/GAP device 236 which is physically separate from a DHCP device 238 in accordance with a fifth embodiment of the present invention. Initially, the host 102a sends a DHCP request for a local address for host 102a to CPE/GAP device 236. The CPE/GAP device 236 forwards the DHCP request to DHCP device 238. The DHCP 238 makes a request for a global address for host 102 to CPE/GAP device 236. The CPE/GAP device 236 then sends a reply with the global address for host 102a to DHCP device 238. The DHCP device 238 then sends a DHCP reply having an address for a local address for host 102a, and either (1) a GA for host 102a or (2) a GA and GPR for host 102a.

In one embodiment, a authentication, authorization, and accounting (AAA) server is utilized. In following described embodiments, a host sends a DHCP request for a local address which is handled by an AAA device. After authorization, the AAA device responds with a DHCP request having the local address, either the (1) GA or (2) GA and GPR, and the address of the GAP device. However, the AAA device may be operable to not provide the GAP device's address so that each global address request is authorized through the AAA device. Additionally, an end host may use a proprietary request, instead of a DHCP request, for a GA.

Figure 4A:
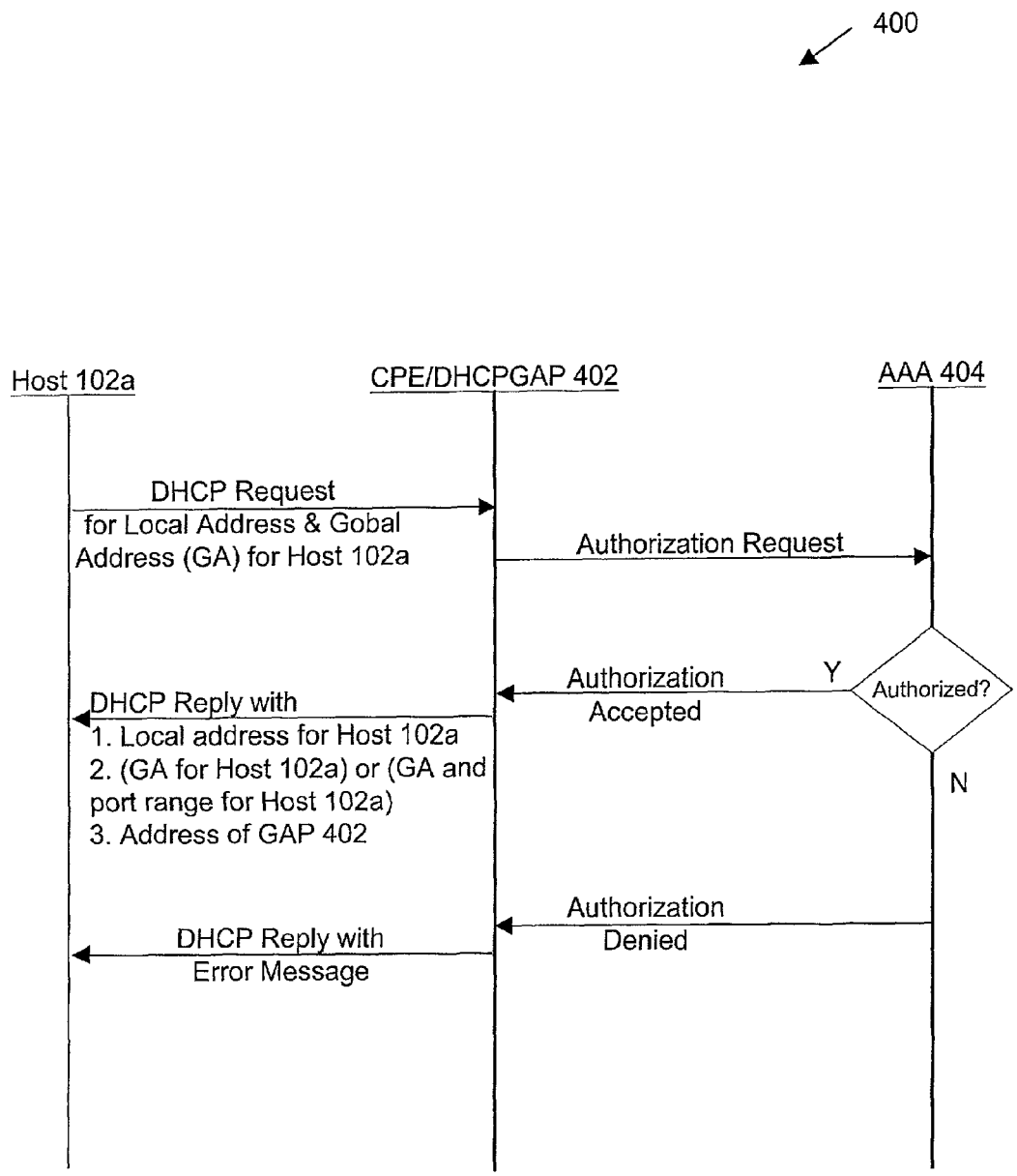
FIG. 4A is a communication diagram illustrating a procedure for a host to obtain either (1) a GA or (2) GA and GPR through a CPE/DHCP/GAP device which authorizes requests with a AAA (authentication, authorization, and accounting) device in accordance with an alternative embodiment of the present invention.

FIG. 4A is a communication diagram illustrating a procedure 400 for a host 102a to obtain a global address through a CPE/DHCP/GAP device 402 which authorizes requests with a AAA device 404 in accordance with an alternative embodiment of the present invention. Initially, host 102a sends a DHCP request for a local address for host 102a to CPE device 402. CPE 402 then sends a authorization request to AAA device 404. The AAA device 404 then determines whether host 102a is authorized by checking the local MAC address of the host 102a as provided in the authorization request.

If the host 102a is authorized, the AAA device 404 then sends an "authorization accepted" message to CPE device 402. The combination CPE/DHCP/GAP device 402 then sends a DHCP reply having a local address for host 102a, either (1) a GA for host 102a or (2) a GA and GPR for host 102a, and an address for the GAP device 402 to host 102a. However, if the AAA server 404 determines that host 102a is not authorized, the AAA device 404 sends an "authorization denied" message to CPE device 402. The CPE device 402 then sends a DHCP reply having an error message to host 102a. If the host 102a runs out of ports within its global port range and it needs to request an additional global port range (GPR), then it can send the request to the GAP device directly and the GAP device will send a reply with the additional global port range (GPR).

Figure 4B:
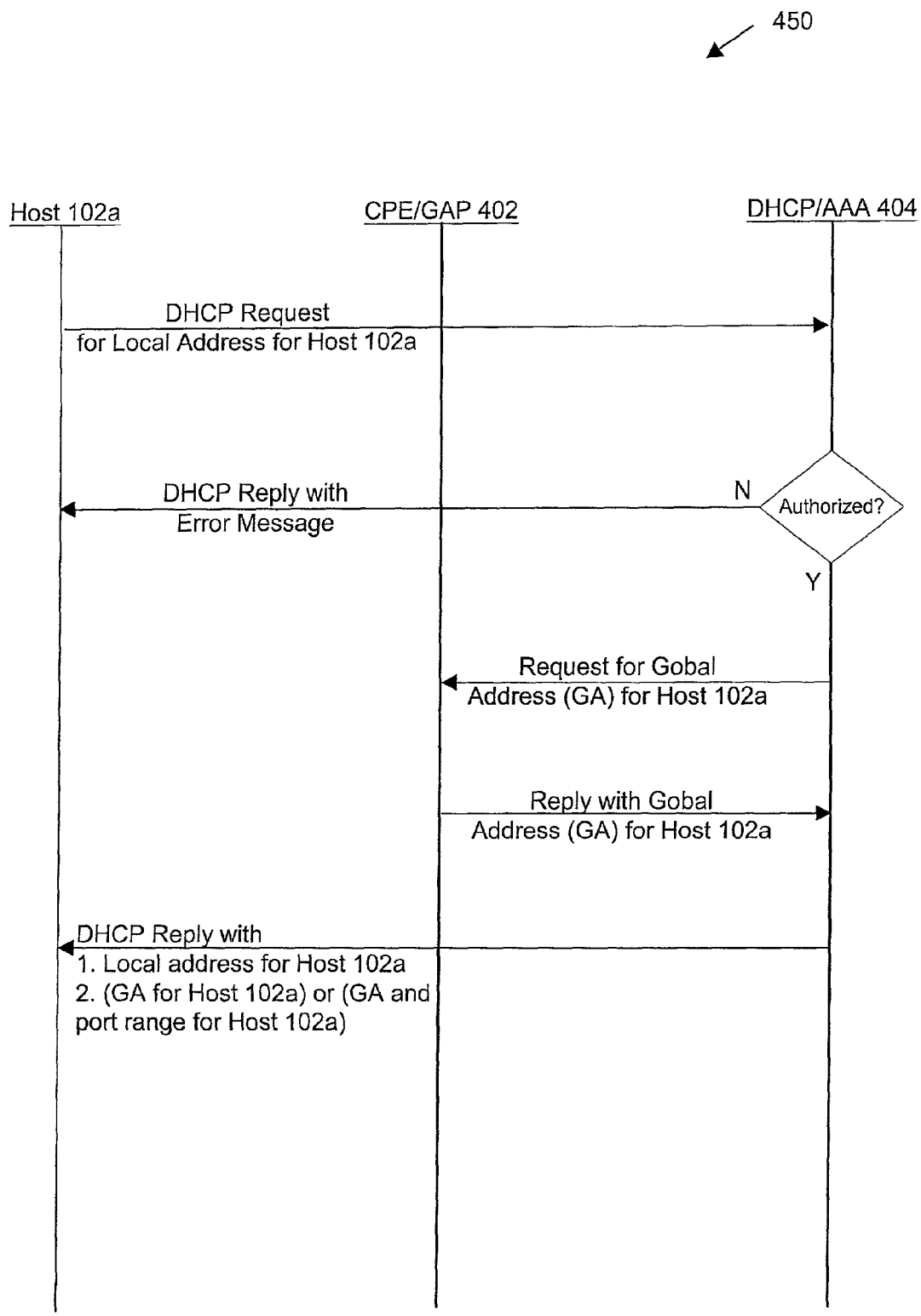
FIG. 4B is a communication diagram illustrating a procedure for a host to obtain either (1) a GA or (2) GA and GPR through an AAA server in accordance with an alternative embodiment of the present invention.

FIG. 4B is a communication diagram illustrating a procedure 450 for a host 102a to obtain a global address through an AAA/DHCP server 404 in accordance with an alternative embodiment of the present invention. Initially, host 102a sends a DHCP request for a global address for host 102a to the AAA/DHCP device 404. The AAA device 404 then determines whether host 102a is authorized by checking the local MAC address of the host 102a as provided in the authorization request. If the host 102a is not authorized, the AAA/DHCP device 404 sends a DHCP reply having an error message to host 102a.

If host 102a is authorized, the AAA/DHCP device 404 sends a request for the global address for host 102a to CPE/GAP device 402. This CPE/GAP device 402 then replies with the global address for host 102a to AAA/DHCP device 404. The AAA/DHCP device 404 then sends a DHCP reply having a local address, and either (1) a GA for host 102a or (2) a GA and GPR for host 102a. If the host 102a runs out of global port range and it needs to request an additional global port range (GPR), it can send the request to either the AAA/DHCP or directly to the GAP and the DHCP or GAP device will send a reply with the additional global port range (GPR).

Each host may be operable to send any suitable type of request for obtaining a global address. As described above in the illustrated embodiment, the request may be a conventional DHCP request for a local address. In another implementation, a DHCP option is included in the DHCP request to indicate that it is a DHCP request for a global address (GA) or global port range (GPR). In this embodiment, the DHCP request may be similar to a conventional DHCP request for a local address, except that it will carry the DHCP option as shown in FIG. 5.

Depending on the particular configuration of the devices for providing a global address (e.g., CPE/DHCP/GAP devices), the reply to the host's DHCP request for a GA or GPR (or both) and the corresponding DHCP reply may each take any suitable format. FIG. 5 is a diagrammatic representation of a DHCP option 500 in a DHCP request or a DHCP reply in accordance with one embodiment of the present invention. As shown, the DHCP option 500 includes an the following fields: an option code 502, an address for the GAP device 504, a GA 106 for the requesting host, a GPR 508 for the requesting host, and a local address (LA) 510 for the requesting host.

A DHCP request from a host may look similar to a conventional DHCP request for a LA, but may include DHCP option 500. The option code may indicate that the DHCP request is a DHCP request for a GA and GPR or a DHCP request for additional GPR. In the case of requesting additional GPR, the requesting host may fill in the LA and GA fields of the DHCP option of its DHCP request.

When a DHCP request for a LA, GA and GPR is received by a responding device (e.g., by a DHCP/GAP device), the responding device may send a DHCP reply with the DHCP option 500 and fill up the DHCP option 500 with the LA, GA and GPR for the requesting host. When a DHCP request for additional GPR is received by the responding device, the responding device may send a DHCP reply with the DHCP option 500 and fill up the DHCP option 500 with additional GPR. In both replies, the option code is not required in the reply and may be set to zero. The reply's DHCP option 500 may also include the address for the GAP device so that the request host may directly request additional GPR when needed. Alternatively, the address of the GAP device may contain a zero value. The host may then simply contact its corresponding edge router, instead of the GAP device, each time it requires an additional GPR. The edge router then contacts the GAP device to obtain a new GPR (if the GAP is separate from the edge router).

Figure 6A:
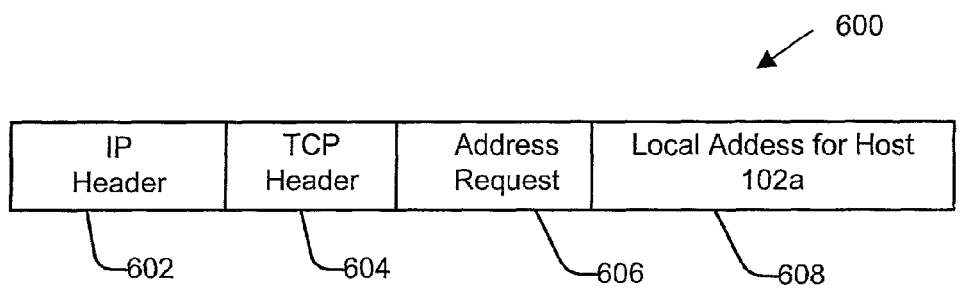
FIG. 6A is a diagrammatic representation of a proprietary request for a global address (GA) in accordance with an alternative embodiment of the present invention.
Figure 6B:
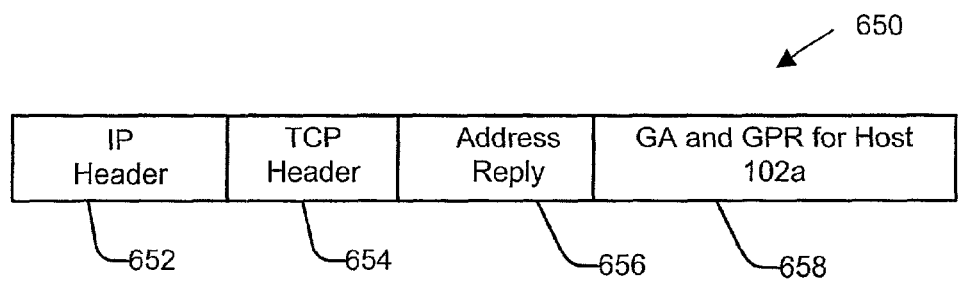
FIG. 6B is a diagrammatic representation of a proprietary reply having either (1) a GA or (2) GA and GPR in accordance with an alternative embodiment of the present invention.

A host may also send a specialized proprietary request 600 as illustrated in FIG. 6A. As shown, the proprietary request 600 includes an IP header 602 which identifies the source and destination for the request, a TCP header 604 which identifies the session between the source and destination, a type field 606 which indicates the type of message, and a content field 608. For a request by a host, the type field 606 indicates that the message is a request for a GA and the content field 608 includes the local address for the host. FIG. 6B illustrates a proprietary reply 650 received by a host. The reply 650 includes an IP header 652, a TCP header 654, a type field 656 which indicates that the message is a reply with a GA, and a content field 658 having the GA and/or GPR for the host. The proprietary request may have been sent by a host or a DHCP device in response to a DHCP request for a local address or GA sent by a host to the DHCP device. The DHCP device then sends a proprietary request to the GAP device, to which the GAP device responds with a proprietary reply with a GA and/or GPR. The GAP device may send the proprietary reply to the DHCP device which sent the proprietary request or to the requesting host.

Figure 7A:
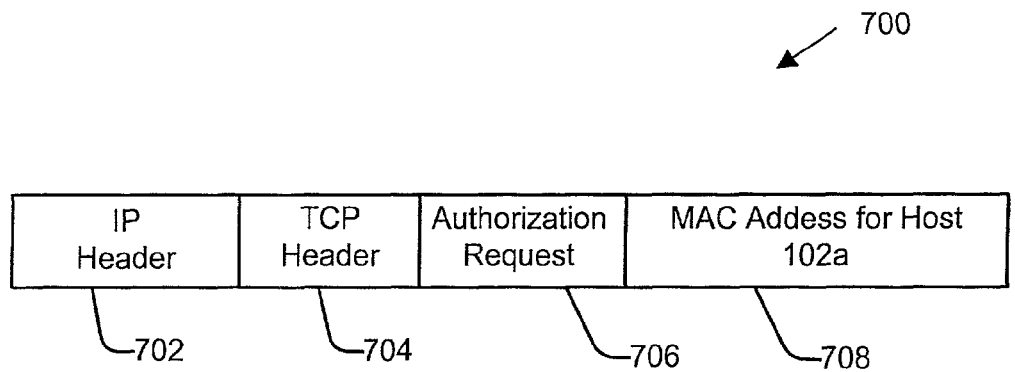
FIG. 7A is a diagrammatic representation of a proprietary authorization request in accordance with one embodiment of the present invention.
Figure 7B:
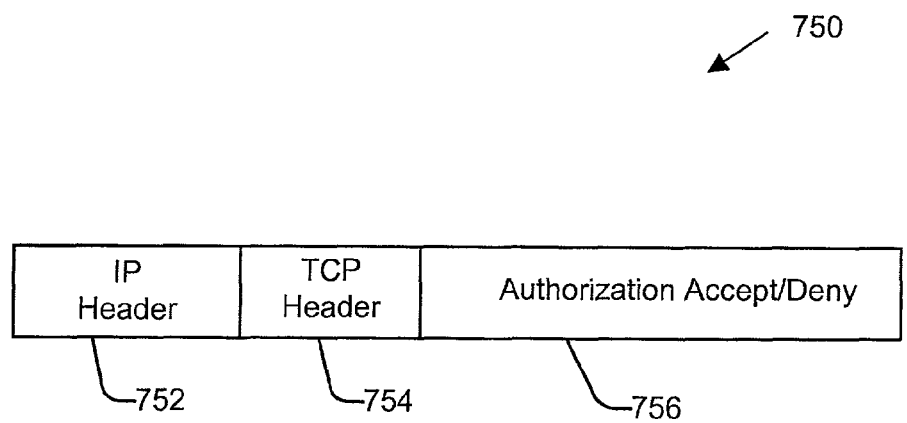
FIG. 7B is a diagrammatic of a proprietary authorization reply in accordance with one embodiment of the present invention.

FIG. 7A is a diagrammatic representation of a proprietary authorization request 700 in accordance with one embodiment of the present invention. As shown, the authorization request generally includes an IP Header 702, a TCP header 704, Authorization request indication 706, and MAC address 708 for host 102a. FIG. 7B is a diagrammatic of a proprietary authorization reply 750 in accordance with one embodiment of the present invention. As shown, the reply 750 includes an IP Header 752, a TCP header 754, and Authorization Accept/Deny field 756 which indicates whether authorization for the requesting host is denied or accepted.

Figure 8:
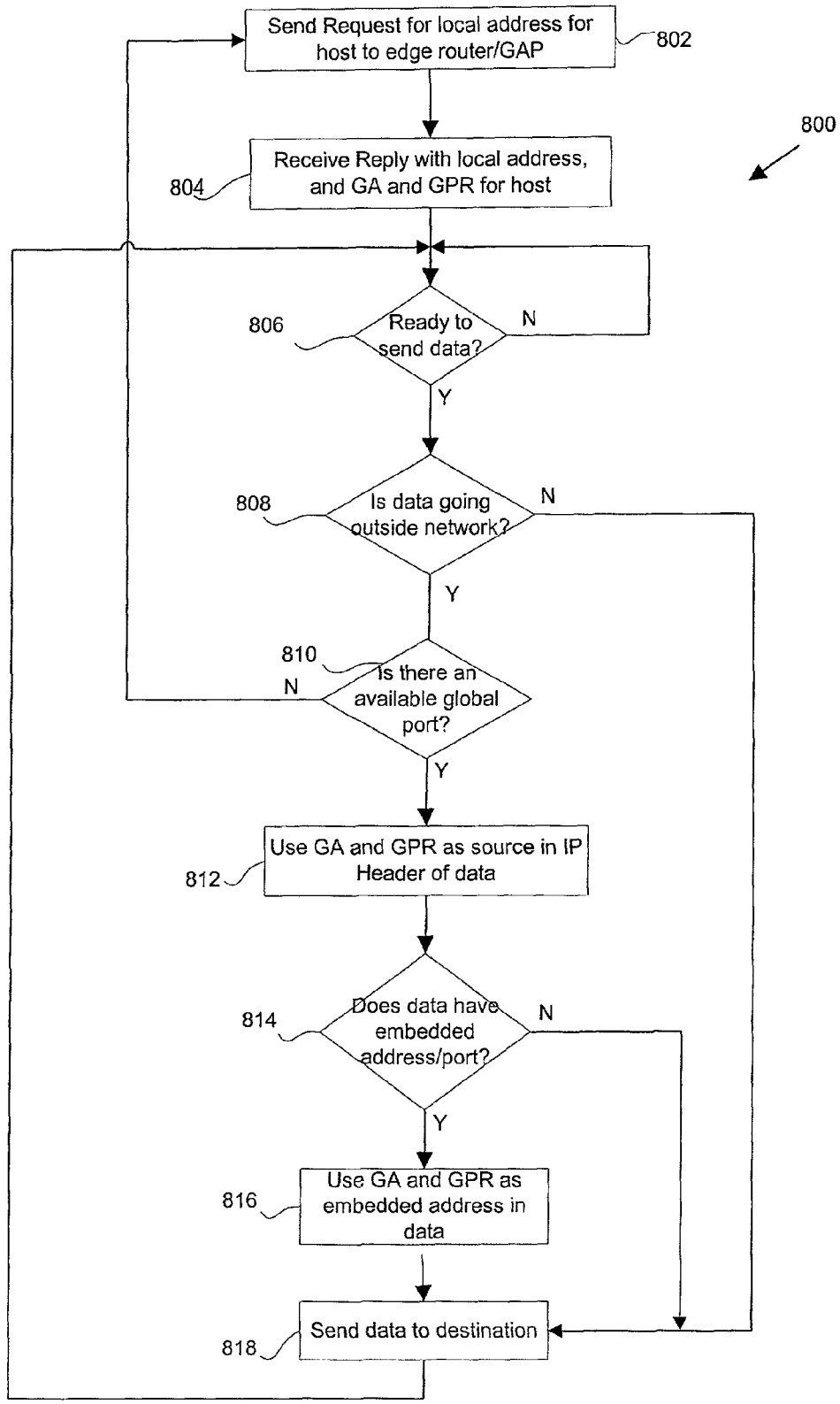
FIG. 8 is a flowchart illustrating a procedure which may be implemented on a host to obtain either (1) a GA or (2) a GA and a GPR in accordance with one embodiment of the present invention.
Figure 9:
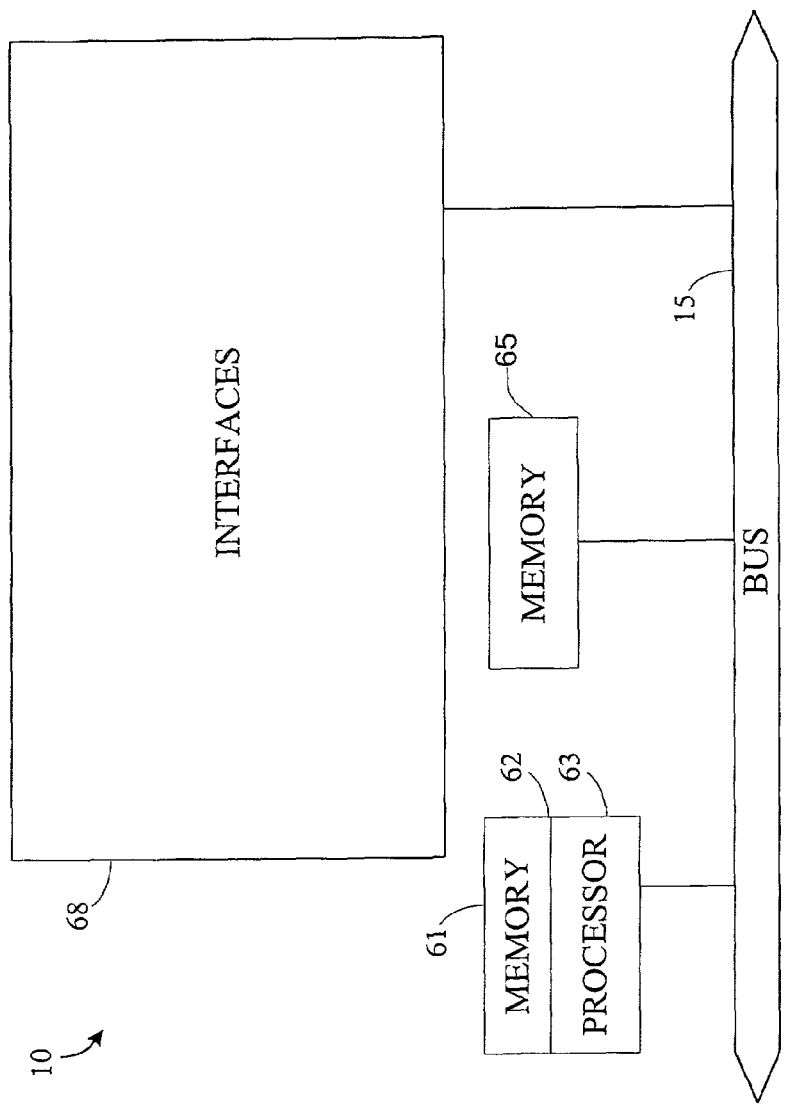
FIG. 9 is a diagrammatic representation of a router in which embodiments of the present invention may be implemented.

FIG. 8 is a flowchart illustrating a procedure 800 which may be implemented on a host to obtain either (1) a GA or (2) a GA and a GPR in accordance with one embodiment of the present invention. Initially, the host sends a request for a global address to its corresponding edge router in operation 802. As described above, this request may be in the form of a proprietary request for a GA, a DHCP request for a GA, or a conventional DHCP request for a local address. For example, host 102a sends a DHCP request for a local address to edge router or CPE 104. A reply having a local address, either (1) a GA or (2) GA and GPR, and optionally an address for the GAP device is then received in operation 804. The reply may be a proprietary reply or a DHCP type reply. Of course, any other appropriate messaging protocol may be utilized for the request or reply.

It is then determined whether data is ready to be sent in operation 806. That is, the following operations 808 through 818 may also be triggered when the host is ready to send data. When data is ready to be sent, it is then determined whether the data is going to an outside or public network in operation 808. If the data is not going to an outside network, the data is merely sent using the host's local address to the destination in operation 818. That is, the local address is used as the source address and as any embedded address that corresponds to the sending host within the data to be sent.

If the data is not going to a public network, it is then determined whether there is an available port in operation 810. Each time the host sends data for a particular application type, for example, the host may require a new port to distinguish its GA from other hosts which use the same GA. In one implementation, the host simply uses the next available port selected from the GPR that was previously obtained from its edge router or GAP device. In certain circumstances, a host may use all of its available ports. If there is not an available port, the host then sends another request for a global address and port in operation 802. This request may be in the form of a DHCP request for a local address, a DHCP request for a global address with DHCP option as described in FIG. 5, or a proprietary request for a global address as described above with reference to FIGS. 6A and 6B. The host may also periodically check for available global ports, independent of the operation of sending data, and operations 810 and 802 are not needed. When the global ports are all used by the host, the host may then request another global port range from its edge router prior to being ready to send data.

Referring back to the illustrated embodiment, if there is an available port, the available global port and GA may then be used within the IP header of the data in operation 812. This operation is optional and translation of the IP header may be left to the Gateway Master (e.g., 110). It is then determined whether the data is to include an embedded address and port which corresponds to the sending host in operation 814. If there is no embedded address and port for the sending host, the data is then sent in operation 818. For example, data using the GA and a next available global port in the IP header may be sent to its destination. If the data has an embedded address, the GA and the next available global port are then used as the embedded address and port of the data in operation 816. The data is then sent to its destination in operation 818. The procedure 800 then waits again for data to be sent in operation 806. Of course, only the GA may be used and not a GPR when only a GA is received by the host.

Several embodiments of the present invention provide advantages over conventional mechanisms for handling embedded addresses. For example, since the host requests a GA (and GPR) from its edge router for use as its embedded address (and global port), the Gateway Master does not have to be configured to analyze the payload of data to translate an embedded address (and port) into a corresponding GA (and global port). Additionally, the local host can now encrypt the payload.

Generally, the techniques of the present invention for handling data having an embedded address or obtaining a global addresses (and a global port range) may be implemented on software and/or hardware. For example, either technique can be implemented in an operating system kernel, in a separate user process, in a library package bound into network applications, on a specially constructed machine, or on a network interface card. In a specific embodiment of this invention, some of the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the data processing systems (e.g., host) may each be implemented on a general-purpose network host machine such as a personal computer or workstation. Further, the invention may be at least partially implemented on a card (e.g., an interface card) for a network device or a general-purpose computing device.

Referring now to FIG. 8, a router 10 suitable for implementing embodiments of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for obtaining a local address, obtaining a global address (and global port range), and altering data to contain an embedded global address and/or global port, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each session or flow and the number of such sessions or flows, application type and their corresponding data formats, a local address, a global address, one or more global port ranges, an address for a GAP device, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of sending data from a first host of a private network, the method comprising:
   sending a request for an address from the first host prior to the first host sending a first data to a second host;
   in response to the request for the address, receiving at the first host a local address for the first host prior to the first host sending the first data to the second host;
   in response to the request for the address, receiving at the first host a global address for the first host prior to the first host sending the first data to the second host;
   at the first host, determining whether the first data is to be sent to a public or private network; and
   at the first host, inserting either the local address or the global address into the first data's payload as an embedded address based on the determination of whether the first data is to be sent to a public or private network and sending the first data with the inserted local address or global address from the first host to the second host.

2. A method as recited in claim 1, wherein the local address for the first host is received by pre-configuring the first host with the local address.

3. A method as recited in claim 1, further comprising:
   when the first data is being sent from the first host of the private network to a public network, using the obtained global address as a source address within the first data; and
   when the first data is being sent from the first host of the private network to a private network, using the obtained local address as a source address within the first data.

4. A method as recited in claim 1, wherein sending the request for an address is accomplished by sending a request for a local address from the first host to an edge router associated with the first host and wherein receiving the local address and the global address is accomplished by receiving a reply at the first host having the local address and the global address.

5. A method as recited in claim 4, wherein the request for the local address is sent to an authorization, authentication, and accounting (AAA) device so the AAA device may determine whether the first host is authorized to receive the global address, wherein the global address is not received by the first host when the first host is not authorized.

6. A method as recited in claim 4, wherein the request for the local address is in the form of a DHCP request for a local address and wherein the reply is a DHCP reply.

7. A method as recited in claim 1, wherein sending the request for an address is accomplished by sending a request for a local address and sending a request for a global address to an edge router associated with the first host and wherein receiving the local address is accomplished by receiving a reply having the local address, and wherein receiving the global address is accomplished by receiving a reply having the global address.

8. A method as recited in claim 7, wherein the reply having the local address also includes an address for a global address provider device and wherein the request for the global address is sent to the global address provider device using the address for the global address provider.

9. A method as recited in claim 7, wherein the request for a global address is sent to an authorization, authentication, and accounting (AAA) device so the AAA device may determine whether the first host is authorized to receive the global address, wherein the global address is not received when the first host is not authorized.

10. A method as recited in claim 7, wherein the request for a local address is a DHCP request for a local address, the reply having the local address is a DHCP reply having the local address, the request for a global address is a DHCP request with a DHCP option indicating that it is a DHCP request for a global address, and the reply having the global address is a DHCP reply having the global address.

11. A method as recited in claim 1, further comprising:
obtaining a global port range for the first host; and
when the first data is being sent from the first host of the private network to a public network and when the first data is to include an embedded port, using a global port selected from the obtained global port range as the embedded port.

12. A method as recited in claim 11, wherein sending the request for the address is accomplished by sending a request for a local address to an edge router associated with the first host and wherein receiving the global address and the local address and obtaining the global port range are accomplished by receiving a reply having the local address, the global address, and the global port range.

13. A method as recited in claim 12, wherein the request for local address is in the form of a DHCP request for a local address and wherein the reply is a DHCP reply.

14. A method as recited in claim 11, wherein sending the request for the address is accomplished by sending a request for a local address and a request for a global address to an edge router associated with the first host and wherein receiving the local address is accomplished by receiving a reply having the local address, and wherein receiving the global address and obtaining the global port range are accomplished by receiving a reply having the global address and the global port range.

15. A method as recited in claim 14, wherein the request for a local address is a DHCP request for a local address, the reply having the local address is a DHCP reply having the local address, the request for a global address is a DHCP request with a DHCP option indicating that it is a DHCP request for a global address, and the reply having the global address and the global port range is a DHCP reply having the global address and the global port range.

16. A method as recited in claim 11, the method further comprising obtaining a second global port range that differs from the first obtained global port range for the first host when all of the global ports within the first obtained global port range are being used by the first host.

17. A method as recited in claim 1, wherein inserting either the local address or the global address into the first data's payload is accomplished by (i) inserting the global address into the first data's payload as an embedded address if it is determined that the first data is to be sent to a public network and (ii) inserting the local address into the first data's payload as an embedded address if it is determined that the first data is to be sent to a private network.

18. A computer system in the form of a first host that is operable to send data from the first host of a private network, the computer system comprising:
one or more processors;
one or more memory, wherein at least one of the processors or memory are adapted to:
send a request for an address from the first host prior to the first host sending a first data to a second host;
in response to the request for the address, receive at the first host a local address for the first host prior to the first host sending the first data to the second host;
in response to the request for the address, receive at the first host a global address for the first host prior to the first host sending the first data to the second host;
at the first host, determine whether the first data is to be sent to a public or private network; and
at the first host, insert either the local address or the global address into the first data's payload as an embedded address based on the determination of whether the first data is to be sent to a public or private network and sending the first data with the inserted local address or global address from the first host to the second host.

19. A method as recited in claim 18, wherein the local address for the first host is received by pre-configuring the first host with the local address.

20. A computer system as recited in claim 18, the at least one of the processors or memory being further adapted to:
when the first data is being sent from the first host of the private network to a public network, using the obtained global address as a source address within the first data; and
when the first data is being sent from the first host of the private network to a private network, using the obtained local address as a source address within the first data.

21. A computer system as recited in claim 18, wherein sending the request for an address is accomplished by sending a request for a local address from the first host to an edge router associated with the first host and wherein receiving the local address and the global address is accomplished by receiving a reply at the first host having the local address and the global address.

22. A computer system as recited in claim 21, wherein the request for the local address is sent to an authorization, authentication, and accounting (AAA) device so the AAA device may determine whether the first host is authorized to receive the global address, wherein the global address is not received by the first host when the first host is not authorized.

23. A computer system as recited in claim 21, wherein the request for the local address is in the form of a DHCP request for a local address and wherein the reply is a DHCP reply.

24. A computer system as recited in claim 18, wherein sending the request for an address is accomplished by sending a request for a local address and sending a request for a global address to an edge router associated with the first host and wherein receiving the local address is accomplished by receiving a reply having the local address, and wherein receiving the global address is accomplished by receiving a reply having the global address.

25. A computer system as recited in claim 24, wherein the reply having the local address also includes an address for a global address provider device and wherein the request for the global address is sent to the global address provider device using the address for the global address provider.

26. A computer system as recited in claim 24, wherein the request for a global address is sent to an authorization, authentication, and accounting (AAA) device so the AAA device may determine whether the first host is authorized to receive the global address, wherein the global address is not received when the first host is not authorized.

27. A computer system as recited in claim 24, wherein the request for a local address is a DHCP request for a local address, the reply having the local address is a DHCP reply having the local address, the request for a global address is a DHCP request with a DHCP option indicating that it is a DHCP request for a global address, and the reply having the global address is a DHCP reply having the global address.

28. A computer system as recited in claim 18, the at least one of the processors or memory being further adapted to:
obtain a global port range for the first host; and
when the first data is being sent from the first host of the private network to a public network and when the first data is to include an embedded port, use a global port selected from the obtained global port range as the embedded port.

29. A computer system as recited in claim 28, wherein sending the request for the address is accomplished by sending a request for a local address to an edge router associated with the first host and wherein receiving the global address and the local address and obtaining the global port range are accomplished by receiving a reply having the local address, the global address, and the global port range.

30. A computer system as recited in claim 29, wherein the request for local address is in the form of a DHCP request for a local address and wherein the reply is a DHCP reply.

31. A computer system as recited in claim 28, wherein sending the request for the address is accomplished by sending a request for a local address and a request for a global address to an edge router associated with the first host and wherein receiving the local address is accomplished by receiving a reply having the local address, and wherein receiving the global address and obtaining the global port range are accomplished by receiving a reply having the global address and the global port range.

32. A computer system as recited in claim 31, wherein the request for a local address is a DHCP request for a local address, the reply having the local address is a DHCP reply having the local address, the request for a global address is a DHCP request with a DHCP option indicating that it is a DHCP request for a global address, and the reply having the global address and the global port range is a DHCP reply having the global address and the global port range.

33. A computer system as recited in claim 28, the at least one of the processors or memory being further adapted to obtain a second global port range that differs from the first obtained global port range for the first host when all of the global ports within the first obtained global port range are being used by the first host.

34. A computer system as recited in claim 18, wherein inserting either the local address or the global address into the first data's payload is accomplished by (i) inserting the global address into the first data's payload as an embedded address if it is determined that the first data is to be sent to a public network and (ii) inserting the local address into the first data's payload as an embedded address if it is determined that the first data is to be sent to a private network.

35. A computer program product for sending data from a first host of a private network, the computer program product comprising:
at least one computer readable medium that is non-transitory;
computer program instructions stored within the at least one computer readable product configured to:
send a request for an address from the first host prior to the first host sending a first data to a second host;
in response to the request for the address, receive at the first host a local address for the first host prior to the first host sending the first data to the second host;
in response to the request for the address, receive at the first host a global address for the first host prior to the first host sending the first data to the second host;
at the first host, determine whether the first data is to be sent to a public or private network; and
at the first host, insert either the local address or the global address into the first data's payload as an embedded address based on the determination of whether the first data is to be sent to a public or private network and sending the first data with the inserted local address or global address from the first host to the second host.

36. A computer program product as recited in claim 35, the computer program instructions stored within the at least one computer readable product further configured to:
when the first data is being sent from the first host of the private network to a public network, using the obtained global address as a source address within the first data; and
when the first data is being sent from the first host of the private network to a private network, using the obtained local address as a source address within the first data.

37. A computer program product as recited in claim 35, wherein sending the request for an address is accomplished by sending a request for a local address from the first host to an edge router associated with the first host and wherein receiving the local address and the global address is accomplished by receiving a reply at the first host having the local address and the global address.

38. A computer program product as recited in claim 37, wherein the request for the local address is sent to an authorization, authentication, and accounting (AAA) device so the AAA device may determine whether the first host is authorized to receive the global address, wherein the global address is not received by the first host when the first host is not authorized.

39. A computer program product as recited in claim 37, wherein the request for the local address is in the form of a DHCP request for a local address and wherein the reply is a DHCP reply.

40. A computer program product as recited in claim 37, the computer program instructions stored within the at least one computer readable product further configured:
obtain a global port range for the first host; and
when the first data is being sent from the first host of the private network to a public network and when the first data is to include an embedded port, use a global port selected from the obtained global port range as the embedded port.

41. A computer program product as recited in claim 40, wherein sending the request for the address is accomplished by sending a request for a local address to an edge router associated with the first host and wherein receiving the global address and the local address and obtaining the global port range are accomplished by receiving a reply having the local address, the global address, and the global port range.

42. A computer program product as recited in claim 41, wherein the request for local address is in the form of a DHCP request for a local address and wherein the reply is a DHCP reply.

43. A computer program product as recited in claim 40, wherein sending the request for the address is accomplished by sending a request for a local address and a request for a global address to an edge router associated with the first host and wherein receiving the local address is accomplished by receiving a reply having the local address, and wherein receiving the global address and obtaining the global port range are accomplished by receiving a reply having the global address and the global port range.

44. A computer program product as recited in claim 43, wherein the request for a local address is a DHCP request for a local address, the reply having the local address is a DHCP reply having the local address, the request for a global address is a DHCP request with a DHCP option indicating that it is a DHCP request for a global address, and the reply having the global address and the global port range is a DHCP reply having the global address and the global port range.

45. A computer program product as recited in claim 40, the computer program instructions stored within the at least one computer readable product further configured to obtain a second global port range that differs from the first obtained global port range for the first host when all of the global ports within the first obtained global port range are being used by the first host.

46. A computer program product as recited in claim 35, wherein sending the request for an address is accomplished by sending a request for a local address and sending a request for a global address to an edge router associated with the first host and wherein receiving the local address is accomplished by receiving a reply having the local address, and wherein receiving the global address is accomplished by receiving a reply having the global address.

47. A computer system as recited in claim 46, wherein the reply having the local address also includes an address for a global address provider device and wherein the request for the global address is sent to the global address provider device using the address for the global address provider.

48. A computer program product as recited in claim 46, wherein the request for a global address is sent to an authorization, authentication, and accounting (AAA) device so the AAA device may determine whether the first host is authorized to receive the global address, wherein the global address is not received when the first host is not authorized.

49. A computer program product as recited in claim 46, wherein the request for a local address is a DHCP request for a local address, the reply having the local address is a DHCP reply having the local address, the request for a global address is a DHCP request with a DHCP option indicating that it is a DHCP request for a global address, and the reply having the global address is a DHCP reply having the global address.

50. An apparatus for sending data from the apparatus, which is in the form of a first host of a private network, the apparatus comprising:
    means for sending a request for an address from the first host prior to the first host sending a first data to a second host;
    means for in response to the request for the address, receiving at the first host a local address for the first host prior to the first host sending the first data to the second host;
    means for in response to the request for the address, receiving at the first host a global address for the first host prior to the first host sending the first data to the second host;
    means for determining, at the first host, whether the first data is to be sent to a public or private network; and
    means for inserting, at the first host, either the local address or the global address into the first data's payload as an embedded address based on the determination of whether the first data is to be sent to a public or private network and sending the first data with the inserted local address or global address from the first host to the second host.

* * * * *